(12) United States Patent
Maeda

(10) Patent No.: US 6,720,056 B2
(45) Date of Patent: Apr. 13, 2004

(54) MULTI-LAYER INFORMATION RECORDING MEDIUM

(75) Inventor: Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 48 days.

(21) Appl. No.: 10/091,345

(22) Filed: Mar. 6, 2002

(65) Prior Publication Data

US 2002/0150717 A1 Oct. 17, 2002

(30) Foreign Application Priority Data

Mar. 8, 2001 (JP) ........................... 2001-064358

(51) Int. Cl.$^7$ ............................ B32B 3/02; G11B 7/24
(52) U.S. Cl. .................. 428/64.4; 428/64.5; 369/275.4; 369/275.1; 430/270.13
(58) Field of Search ............................ 428/64.2, 64.4, 428/64.5; 369/288, 275.4, 275.1; 430/270.1, 270.13

(56) References Cited

U.S. PATENT DOCUMENTS 6,190,750 B1 * 2/2001 Wierenga et al. .......... 428/64.1
6,438,098 B1 * 8/2002 Nakajima et al. ......... 369/275.4
2001/0033543 A1 * 10/2001 Akiyama et al. ......... 369/275.4

* cited by examiner

*Primary Examiner*—Deborah Jones
*Assistant Examiner*—G. Blackwell-Rudasill
(74) *Attorney, Agent, or Firm*—Morgan, Lewis & Bockius LLP

(57) ABSTRACT

The present invention relates to a rewritable multi-layer recording medium that ensure appropriate data reading from and writing in an arbitrary recording layer of a plurality of recording layers. The recording layers are stacked via spacer layers. Each recording layer is made from a material of which reflectance changes upon radiation of a light beam. Information or data is written in the recording layer as a result of reflectance change. Each recording layer has at least one groove and/or at least one pit. A certain layer in which the information is to be written (recorded) has a rewritable region. An adjacent layer has a window region through which the light beam passes and reaches the rewritable region. The window region imparts a diffraction effect, which is different from a diffraction effect impartable from a region surrounding the window region, to the passing light beam.

22 Claims, 7 Drawing Sheets

MULTI-LAYER INFORMATION RECORDING MEDIUM

BACKGROUND OF THE INVENTION

1. Field of the Invention

The present invention generally relates to an optical information recording medium such as an optical disc for recording information on a track of the recording medium, and more particularly to a multi-layer recording medium having a plurality of recording layers stacked via spacer layers to admit information recording on and information reading from these recording layers.

2. Description of the Related Art

In recent times, information recording media known as DVDs (digital versatile discs) and record/playback systems using such DVDs have become widely known. DVDs are available as DVD-ROMs, DVD-Rs, DVD-RWs, DVD-RAMs, and so on. The DVDs are categorized into the above mentioned types depending upon the recording and/or reading schemes. Referring to FIG. 1 of the accompanying drawings, illustrated is an enlarged schematic view of a recording surface of a DVD-ROM, which is a read-only optical disc. The DVD-ROM has a train of embossed pits, which is a series of concave or convex, on the recording surface as recorded information. A series of concave or convex defines a track. As shown in FIG. 2 of the accompanying drawings, DVD-RW and DVD-R, which are rewritable and recordable optical discs, have pits and grooves formed on the recording surface. The recording surface is made from a dye or a phase-change material. A train of pits (recording indicia) which possess different reflectance is formed on the top of the grooves as recorded information. The pits having different reflectance are created when a beam of light is focused on the grooves as a light spot. The structure of the optical disc depicted in FIG. 2 is referred to as a groove recordation type. Still another optical disc structure is known, which is called a land-groove recordation type optical disc structure as shown in FIG. 3 of the accompanying drawings. A typical example of this type is DVD-RAM, which permits data recording and deleting. In the land-groove type structure, lands and grooves are formed from the phase-change material, and pits (recording indicia) are formed on the lands and grooves.

In order to increase recording density of an optical disc, use of a plurality of recording layers is proposed. An optical disc having more than one recording layer is also one type of the DVDs. Referring to FIG. 4 of the accompanying drawings, a two-layer optical disc of ROM type is illustrated as one example of the multi-layer optical discs. This optical disc has a first recording layer L1 proximal to a pickup, and a second recording layer L2 on the distal side. The first recording layer L1 is located below a transparent cover layer when viewed from the pickup. The first recording layer or upper layer L1 is semitransparent because the beam of light should pass the upper layer L1 and reach the second recording layer or lower layer L2 when retrieving a signal (information) from the lower layer L2. The lower layer L2 is reflective. A spacer layer is interposed between the upper and lower layers L1 and L2 to separate the upper layer L1 from the lower layer L2 with a certain distance. The spacer layer is light transparent (transmissive).

In addition to use of the multi-layer structure, reduction of a diameter of the light spot formed on the recording layer is proposed to increase the recording density of the optical disc. The light spot diameter reduction is achieved by increasing a numerical aperture of an object lens, through which the light beam is radiated to the recording layer to create the light spot on the recording layer. However, spherical aberration occurs in a larger amount as the numerical aperture increases. The spherical aberration increases when the total thickness from the transparent cover layer to a target or desired recording layer, in which information is to be recorded, increases because other recording layer(s) and spacer layer(s) exist in between. The multi-layer optical disc includes a plurality of recording layers stacked via the spacer layers, the recording layers are made from a material which cause reflectance variations upon radiation of the light beam, and the grooves and/or pits are created as a result of localized reflectance change on the recording layers. In such multilayer optical disc, the distance between adjacent recording layers must be reduced in order to accurately focus the light spot having a reduced diameter on the desired recording layer.

The spacer layer thickness should be reduced to shorten the distance between adjacent recording layers. The reduction of the spacer layer thickness, however, causes the light beam recording condition to deviate from the most common optimal condition. Appropriate information recording cannot be expected under such condition. The multi-layer optical disc is an example of multi-layer recording media.

SUMMARY OF THE INVENTION

An object of the present invention is to provide a multi-layer information recording medium of rewritable type, that can ensure appropriate recording and reading of information into and from each of the recording layers.

In order to accurately record small recording marks in each of recording layers made from a phase change material when recording data on a multi-layer optical disc, it is necessary to optimize recording conditions for the respective recording layers. To this end, a particular area on a target recording layer is used as a write area for trial purpose (trial recording area). Data is first recorded in this trial recording area, and the recorded data is read from the trial recording area and examined. An optimal recording condition for this recording layer is then determined in accordance with a result of the examination. Actual data recording (substantial recording after the trial recording) can be then started with the optimal condition.

It should be assumed here that the optical disc has two layers L1 and L2. Trial data recording into the lower layer L2 is performed with a light beam that has passed the upper layer L1. During this trial data recording, however, there is a problem that a recording condition for the lower layer L2 slightly changes (is slightly influenced) depending upon a track position of the upper layer L1 because the light beam passes the track on the upper layer L1 and reaches the lower layer L2. This is because in reality it is impossible to attach the upper layer L1 onto the lower layer L2 in a perfect manner (with ideal positional relationship between grooves of the upper layer L1 and grooves of the lower layer L2).

In most cases (or practically), there is some misalignment between the upper and lower layers L1 and L2, and the size of misalignment changes with the location on the lower layer L2. For instance, if the center of the upper layer L1 is deviated from the center of the lower layer L2, the misalignment is larger in a peripheral area than in a center area. The practically (possible) optimum recording condition for the lower layer L2 can be obtained if the recording condition determined by the trial recording is an average of a plurality of optimum conditions obtained from various locations of the lower layer L2. However, if the distance between the upper and lower layers is small, positions or shapes of the grooves of the spacer layer relative to the trial recording region influence the recording condition. In particular, as shown in FIG. 5, each groove has a width so that a position of a particular groove of the spacer layer does not change relative to the trial recording region to a certain extent. As a result, the recording condition obtained by the trial recording has some discrepancy from the average optimal condition. Consequently, when the substantial data recording is performed after the trial recording, and the data is recorded in a region having a different groove position condition from the groove position condition of the trial recording, appropriate data recordation cannot be expected.

According to one aspect of the present invention, there is provided a multi-layer information recording medium comprising: a plurality of recording layers, each recording layer having at least one groove and/or at least one pit; at least one spacer layer, each spacer layer being interposed between two adjacent recording layers; an information rewritable region defined in a first recording layer of the recording layers, the first recording layer being a layer in which the information is to be written; and a window region defined in a second recording layer of the recording layers adjacent to the first recording layer for passing a light beam to the information rewritable region and imparting a first diffraction effect to the passing light beam. The second recording layer has the window region and a remaining portion. The first diffraction effect is different from a second diffraction effect imparted from the remaining portion of the second recording layer. Each recording layer may be made from a material of which reflectance changes upon radiation of the light beam. Information is writable in each recording layer as a result of reflectance change made in each recording layer. Even if the distance between the first and second recording layers is small, the window region reduces or minimizes influences of the groove(s) of the second recording layer on the recording into the rewritable region (trial recording region). Size and shape of the window region may be determined to match this goal. Accordingly, accurate recording and reading of data can be performed to the first recording layer. In other words, there is provided a recording medium that has high recording density and good information quality.

Depth of a groove and depth of a pit formed in the window region may be different from depth of another groove and depth of another pit formed in the remaining region of the second recording layer respectively.

A distance between adjacent grooves and a distance between adjacent pits formed in the window region may be different from a distance between adjacent grooves and a distance between adjacent pits formed in the remaining region of the second recording layer respectively.

The multi-layer information recording medium may further include a flat interface formed in the window region.

Each of the plurality of recording layers may include at least one of a land track and a groove track.

Each of the plurality of recording layers may include a medium layer made from a phase change material.

DETAILED DESCRIPTION OF THE INVENTION

Embodiments of the present invention will be described in reference to FIGS. 6 to 10.

Figure 1:
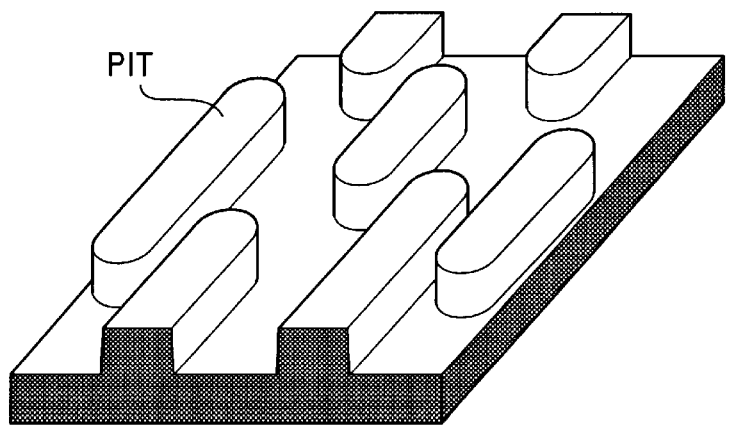
FIG. 1 is an enlarged schematic perspective view showing a structure of a ROM optical disc.
Figure 2:
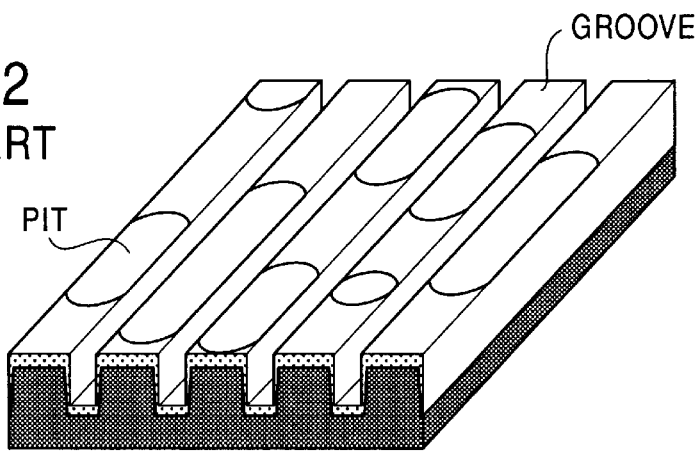
FIG. 2 is an enlarged schematic perspective view showing a structure of a groove recording type optical disc.
Figure 3:
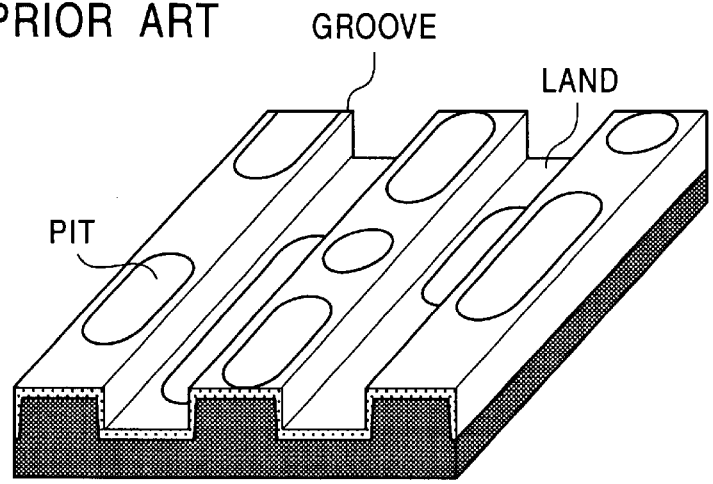
FIG. 3 is an enlarged schematic perspective view showing a structure of a land-groove recording type optical disc.
Figure 4:
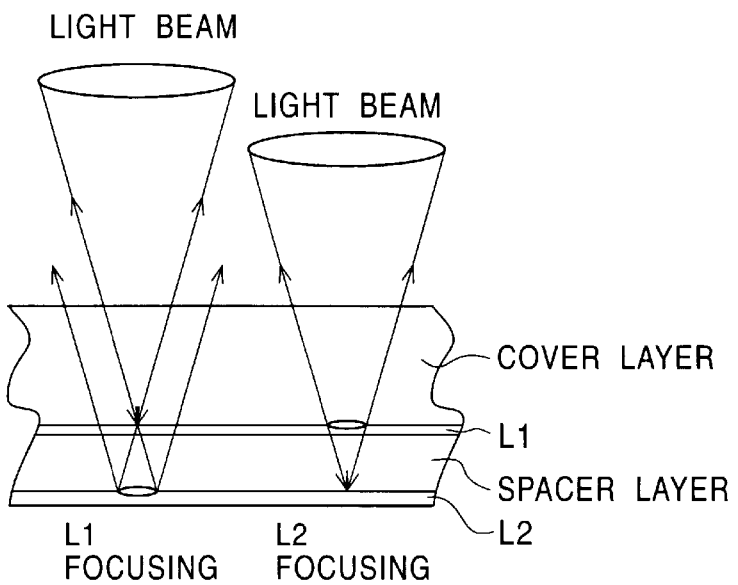
FIG. 4 illustrates an enlarged schematic cross sectional view of a ROM optical disc having two recording layers.
Figure 5:
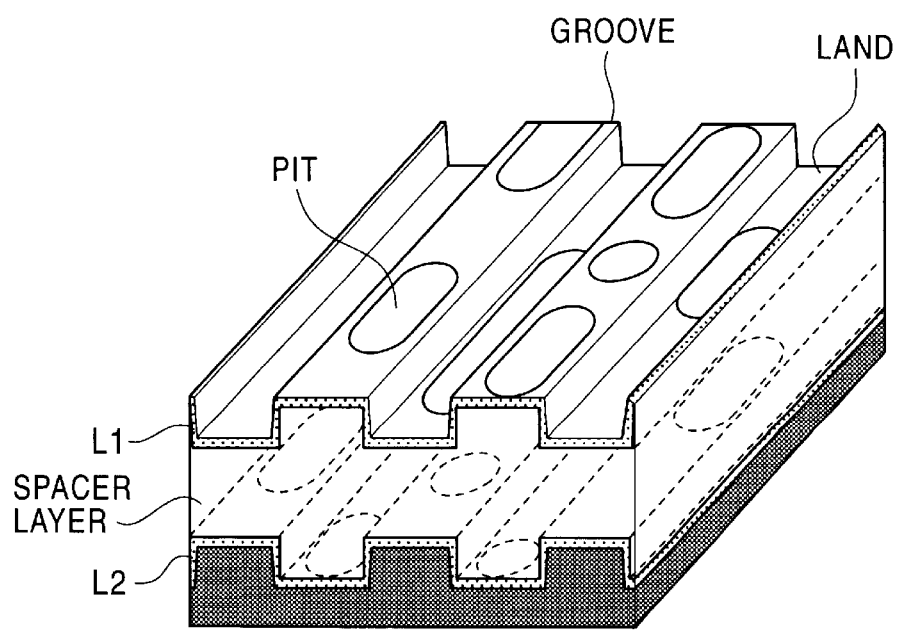
FIG. 5 illustrates a schematic perspective view of a land-groove recording type optical disc having two recording layers.
Figure 6:
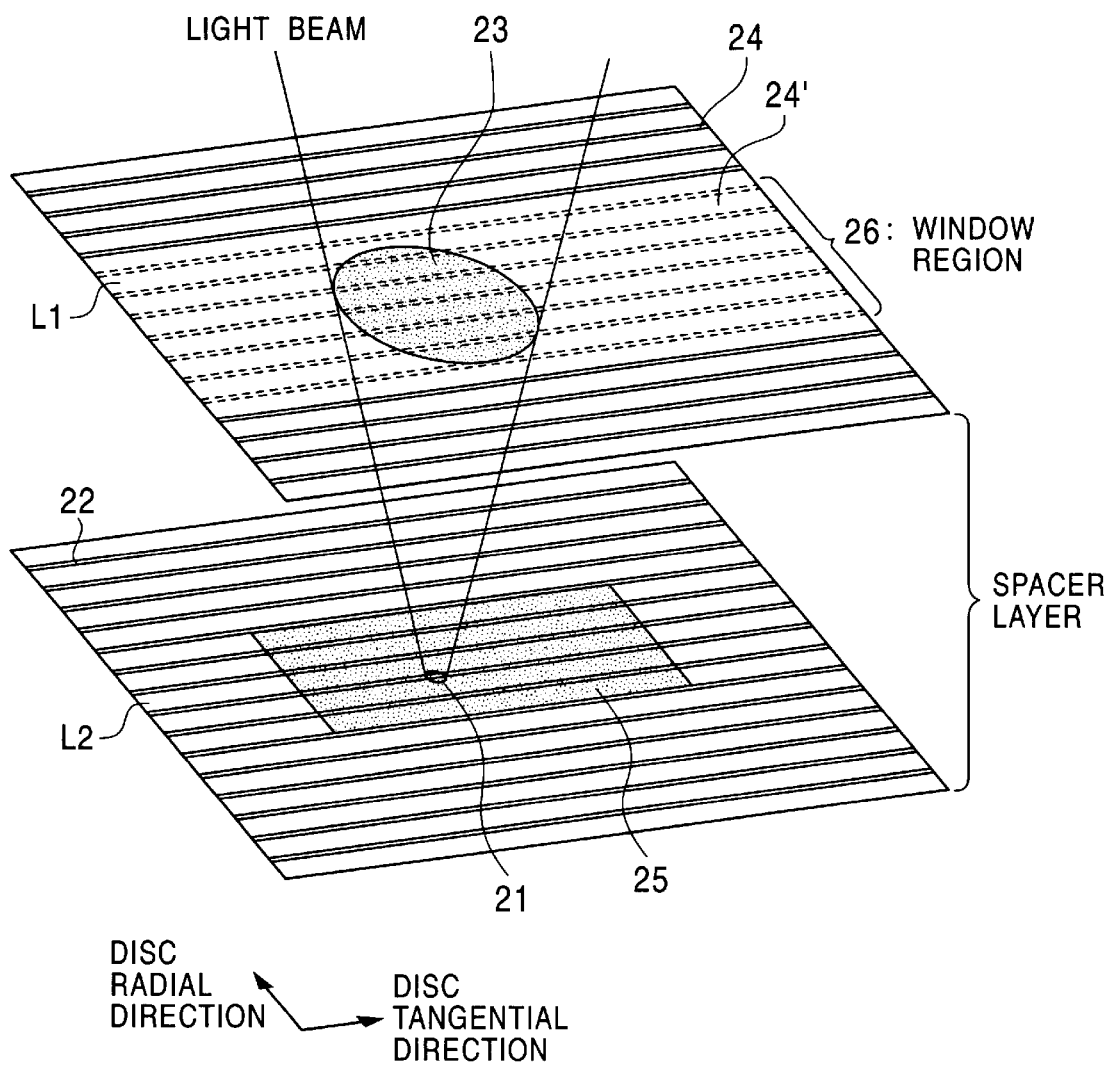
FIG. 6 is an enlarged schematic perspective view showing a structure of a multi-layer optical disc according to an embodiment of the present invention.
Figure 7:
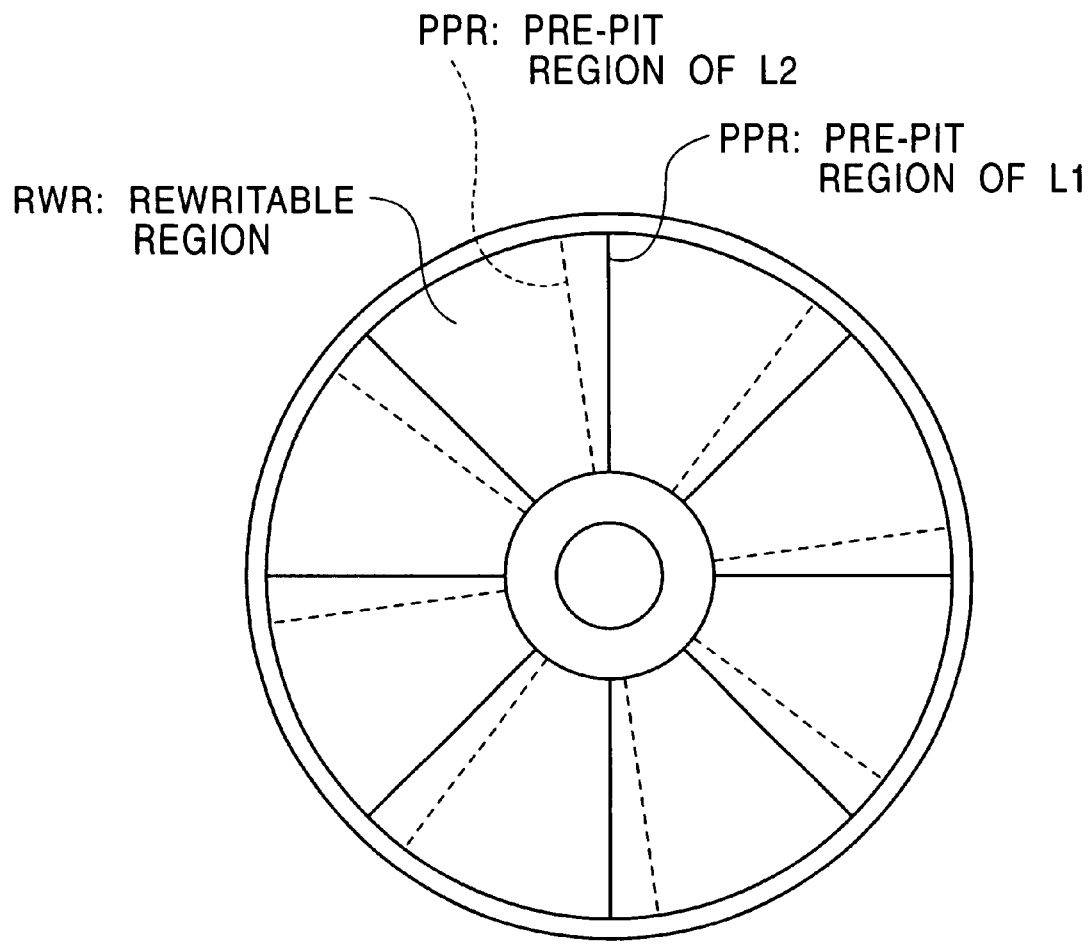
FIG. 7 is a plan view of the multi-layer optical disc shown in FIG. 6.

Referring first to FIG. 6, a structure of an optical disc according to a first embodiment of the present embodiment is illustrated. A multi-layer optical disc has, for example, upper and lower layers L1 and L2 stacked via a spacer layer. Thus, this multi-layer optical disc possesses a two-layer structure. In this drawing, a light beam is focused on the lower layer L2 to create a light spot 21. Grooves 22 are formed in the lower layer L2. A relatively large unfocused light spot 23 is formed on the upper layer L1 by the light beam. Two kinds of grooves 24 and 24' are created in the upper layer L1. The grooves 24 are indicated by the solid line and the grooves 24' are indicated by the broken line. Reference numeral 25 designates a recording area for trial purpose on the lower layer L2. This area 25 is a rewritable area defined on a target recording layer. Reference numeral 26 designates a window area for passing the light beam toward the rewritable area 25. The window area 26 also imparts diffraction to the passing light beam. This diffraction differs from diffraction given by the area surrounding the area 26 in the upper layer L1. Intensity of diffraction may be measured or calculated from the light beam that has reached the lower layer L2. It should be noted that although the two-layer optical disc is described in this particular embodiment, the present invention is not limited in this regard. Specifically, the multi-layer optical disc may have three or more recording layers. Further, the multi-layer optical disc may include a data rewritable area RWR (i.e., an area in which data can be deleted and written) and a pre-pit area PPR (i.e., an area in which a series of embossed pits are provided beforehand representing certain information such as addresses and recording timing). Such multi-layer optical disc is illustrated in FIG. 7. This optical disc is a two-layer optical disc of CAV (constant angular velocity) type. The pre-pit regions PPR are formed radiantly on the upper layer L1 at constant angular intervals like spokes so that the rewritable region RWR is divided into a plurality of sections. Likewise, the pre-pit regions PPR are formed radiantly on the lower layer L2 at constant angular intervals so that the rewritable region RWR is divided into a plurality of sections. The pre-pit regions are formed such that the pre-pit regions PPR on the upper layer L1 do not overlap the pre-pit regions PPR on the lower layer L2.

Each of the upper and lower layers L1 and L2 has a laminated structure. Specifically, the recording layer L1 (or L2) includes a medium layer made from a phase change material such as Ag-In-Sb-Te, and protecting layers sandwiching the medium layer. The protecting layers are made from vitreosity such as ZnS-SiO2. When information is recorded on the optical disc, laser parameters should be adjusted (and determined) in accordance with various recording conditions such as recording power, pulse waveform during recording, recording sensitivity of the recording layers, temperature, influences of laser wavelength variations. To this end, a light beam is (repeatedly) radiated from the laser to the trial recording region 25 of the recording layer L2 under various laser conditions (recording conditions) to record certain data in the trial recording region 25, and the recorded data is read (retrieved, reproduced) and examined (evaluated) to find out an optimal condition in view of predetermined evaluation standards. Accordingly, actual data recording and reading can be performed with the light beam radiated under the optimal condition.

In FIG. 6, the grooves 24' formed in the window region 26 on the upper recording layer L1 have a depth shallower than a depth of the grooves 24 formed in the neighboring (remaining) region on the upper recording layer L1. Therefore, intensity of the light beam which is diffracted by the grooves 24' of the window region 26 and reaches the lower layer L2 is weakened, as compared with intensity of the light beam which is diffracted by the grooves 24 of the neighboring region on the upper layer L1. Data is recorded (written) into the trial recording region 25 by the light beam passing the window region 26. As a result, influences on the trial recording by the grooves 24' are reduced (moderated). In other words, the trial recording is less influenced by positional relationship between the grooves of the upper layer L1 and the grooves of the lower layer L2. Preferably, the window region 26 and trial recording region 25 do not overlap the pre-pit regions. It should be noted that more than one window region 26 may be formed in the upper layer L1.

Figure 8:
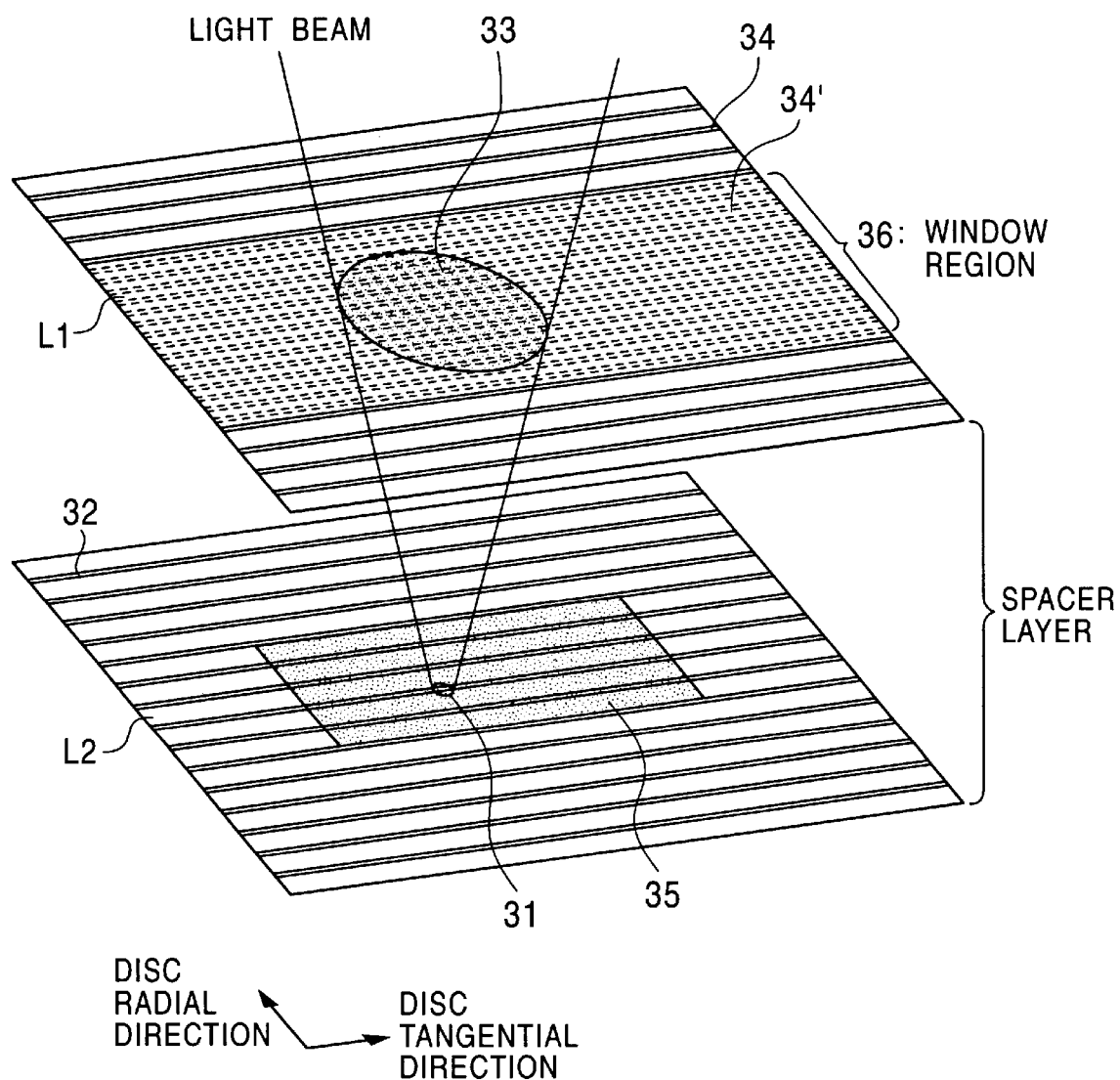
FIG. 8 is an enlarged schematic perspective view showing a structure of a multi-layer optical disc according to another embodiment of the present invention.

FIG. 8 illustrates a structure of an optical disc according to a second embodiment of the present invention.

Like the first embodiment, a multi-layer optical disc has two recording layers L1 and L2 stacked via a spacer layer. A light beam is focused on the lower recording layer L2 to create a light spot 31. Grooves 32 are formed on the lower recording layer L2. The lower layer L2 also has a trial recording region 35. The light beam forms an unfocused light spot 33 on the upper recording layer L1. Two types of grooves 34 and 34' are formed on the upper recording layer L1. The grooves 34 are indicated by the solid line and the grooves 34' are indicated by the broken line. The grooves 34' are formed in a window region of the upper layer L1 and the grooves 34 are formed in the remaining (surrounding) region of the upper layer L1. In this embodiment, a groove-to-groove interval (or pitch) of the grooves 34' is smaller than that of the grooves 34. The light beam from a light source (e.g., laser) passes the window region 36 when data is recorded in the trial recording region 35. The groove-to-groove pitch is reduced such that the light beam diffracted by the grooves 34' is not directed to the trial recording region 35 on the lower layer L2 when recording the data in the trial recording region 35. Alternatively, the groove-to-groove pitch is reduced such that at least some portion of the diffracted light beam is directed outside the trail recording region 35. Consequently, influences on the trial data recording by the grooves 34' of the upper layer L1 is significantly reduced. In other words, the trial data recording is less influenced by positional relationship between the grooves of the upper layer L1 and the grooves of the lower layer L2. It should be noted that more than one window region 36 may be formed in the upper layer L1.

Figure 9:
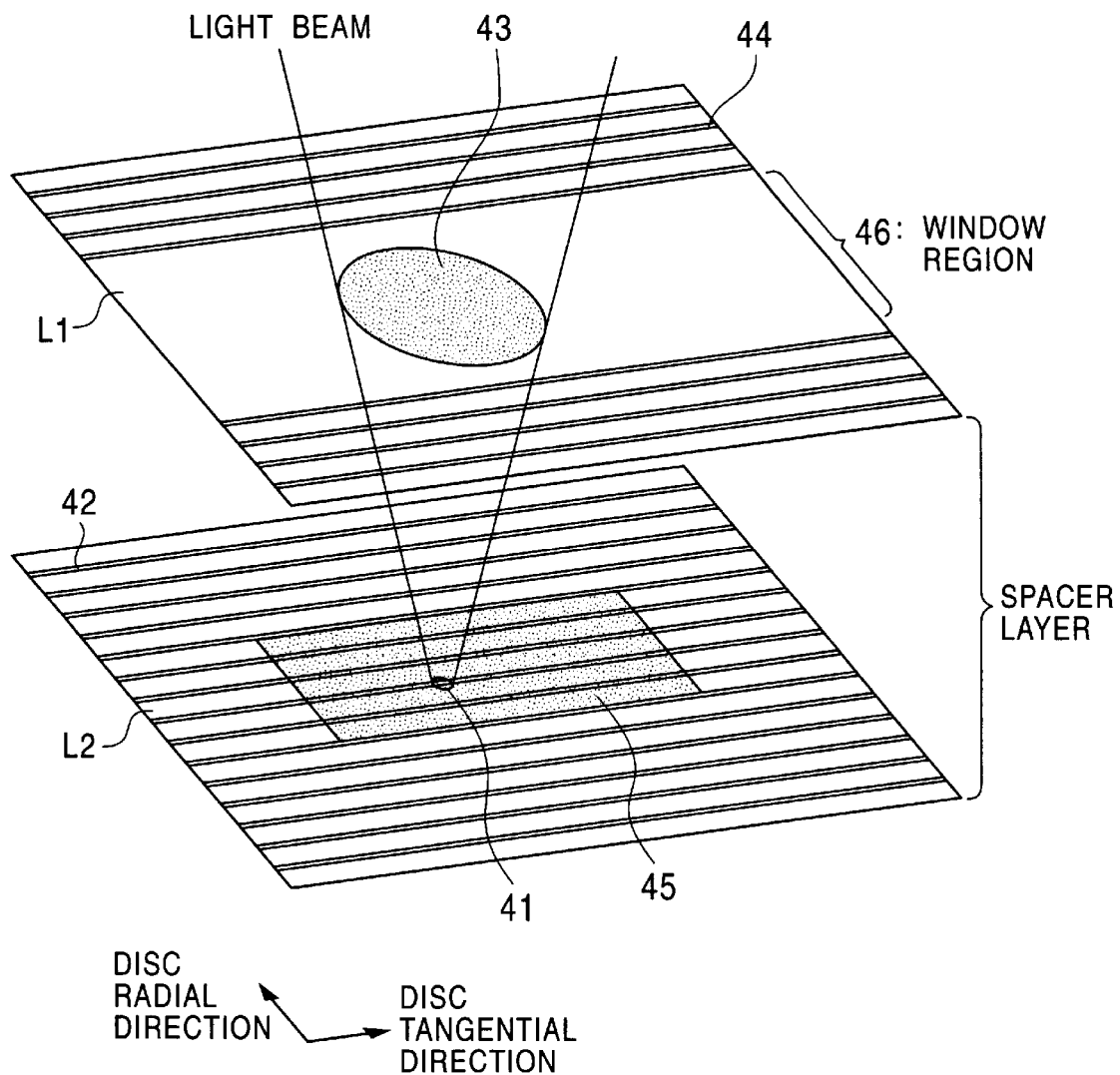
FIG. 9 is an enlarged schematic perspective view showing a structure of a multi-layer optical disc according to still another embodiment of the present invention.

FIG. 9 illustrates a structure of an optical disc according to a third embodiment of the present invention.

Like the first embodiment, a multi-layer optical disc has two recording layers L1 and L2 stacked via a spacer layer. A light beam is focused on the lower recording layer L2 to create a light spot 41. Grooves 42 are formed on the lower recording layer L2. The lower layer L2 also has a trial recording region 45. The light beam forms an unfocused light spot 43 on the upper recording layer L1. Grooves 44 are formed on the upper recording layer L1 and indicated by the solid line. The grooves 44 are formed in a region surrounding a window region 46 on the upper layer L1. In this embodiment, no grooves are formed in the window region 46. The light beam from a light source (e.g., laser) passes the window region 46 when data is recorded in the trial recording region 45. Accordingly, influences on the trial data recording by the grooves of the upper layer L1 is eliminated. In other words, the trial data recording is not influenced by positional relationship between the grooves of the upper layer L1 and the grooves of the lower layer L2. It should be noted that more than one window region 46 may be formed in the upper layer L1.

It should be noted that although the influences of the upper layer L1 are reduced or eliminated in connection with the trial recording region in the above described embodiments, the present invention is not limited in this regard.

For example, if a wavelength of a light source differs from when data is recorded in (or read from) the upper recording layer L1 of the optical disc to when data is recorded in (or read from) the lower recording layer L2, it may be necessary to read data, which represents a type of the optical disc, index or the like, at a certain wavelength other than an inherent (originally designed, default) reading wavelength. In such instance, the influences of the upper layer L1 should be reduced to the minimum when the data is read. The present invention can be applied to such case. Specifically, the present invention is able to appropriately retrieve data (signal, information) even under such severe circumstances.

Although the track on the upper layer L1 is the groove(s) in the above described embodiments, the track may be a series of pits. If the optical disc is a read-only (ROM) type, the track is defined by a series of pits. In this case, the first embodiment should be modified somewhat; the intensity of the diffracted light beam is weakened by the shallower pits, not the shallower grooves.

Although the multi-layer optical disc has the two recording layers L1 and L2 in the above described embodiments, the multi-layer optical disc may have three or more recording layers. In such optical disc, there may be a plurality of recording layers stacked over a target recording layer. The target recording layer is a layer having a trial recording region, and the other layers are piled up on the target layer together with spacer layers. All or some or one of the layers placed on the target layer may have the window region(s).

Furthermore, transmissivity of the spacer layer on the lower layer L2, that of the upper layer L1 on the spacer layer, and that of a cover layer (not shown) on the upper layer may be determined such that recording to and reading from the lower layer L2 are performed advantageously. The transmissivity of the spacer layer, the upper layer L1 and the cover layer may be different (from each other) with respect to a particular wavelength. Thus, the present invention can be implemented with various techniques developed to improve signal recording and reading in a multi-layer optical disc.

Although the window region is an annular region on the optical disc around a center opening of the optical disc in the above described embodiments, the shape of the window region is not limited to the annular shape. For example, the window region may have a rectangular shape or a (truncated) sector shape. The window region may be a region inside or outside a particular diameter on the optical disc. In short, the size and shape of the window region can be determined arbitrarily as long as the light beam passes the window region and reaches the trial recording area on the lower layer L2. In addition, even if the light beam that passes the window region does not reach a certain portion of the lower layer L2, the window region may be formed in the upper layer L1 because circumstances may demand the presence of the window region. For instance, the influences of the tracks on the upper layer L1 should be reduced when a particular signal format is employed. The window region can reduce the influences of the tracks as long as the window region is formed within the confinement of the optical disc.

Figure 10:
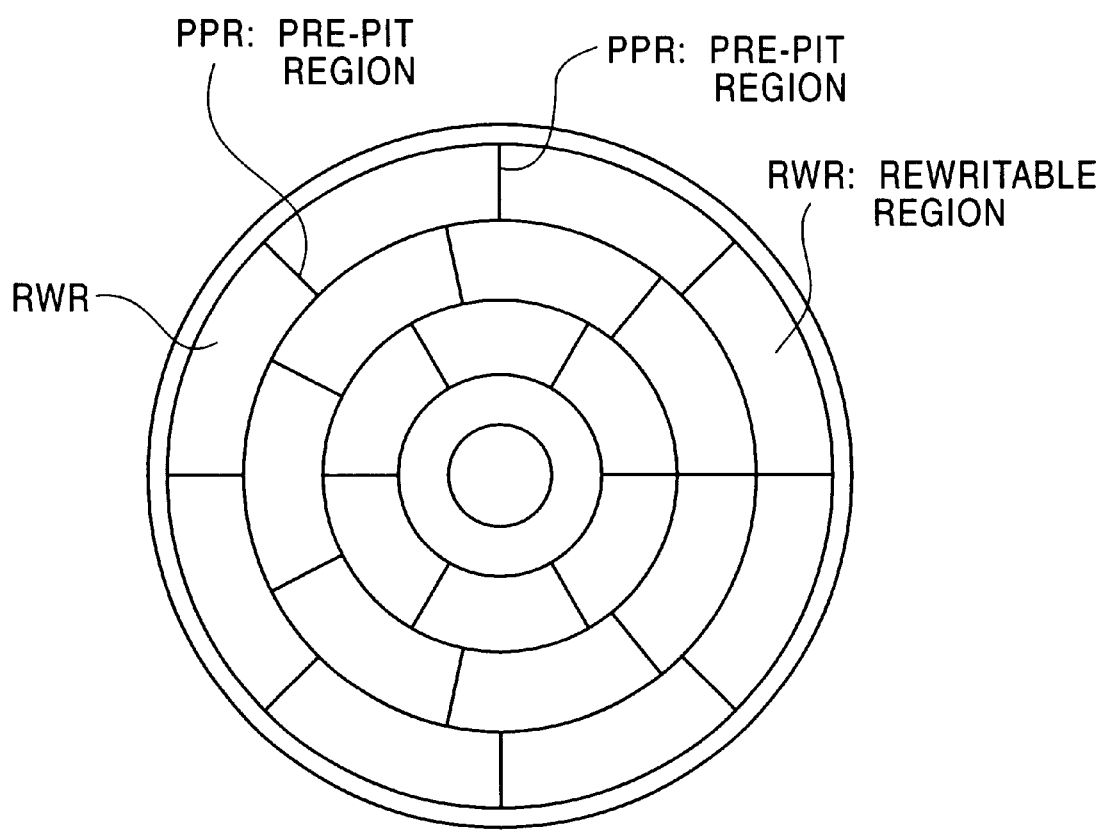
FIG. 10 is a plan view of an multi-layer optical disc of zone CAV or CLV type according to yet another embodiment of the present invention.

Although the multi-layer optical disc in the above described embodiments is a CAV type one, the optical disc may be a CLV (constant linear velocity) type one. In the CLV optical disc, the window regions may be formed periodically in a tangential direction of the optical disc. The window regions may be evenly formed all over (throughout) the upper layer L1 of the optical disc. The optical disc may be a zone CLV or CAV type, in which CLV or CAV design is combined. In such optical disc, as shown in FIG. 10, the (truncated) sector-shape rewritable regions RWR may be formed, with the pre-pit regions PPR defining the borders of the rewritable regions.

It should be noted that the recording medium is the optical disc in the above described embodiments, but the present invention is not limited to the optical disc. The present invention can be applied to any optical recording medium having a plurality of layers. For instance, the recording medium of the present invention may be a holographic memory in which multiple exposure is possible even in a thickness direction.

The groove depth in the window region 24' is reduced in the first embodiment and the groove pitch in the window region 34' is reduced in the second embodiment. In an alternative embodiment, the groove depth and pitch are both reduced in the window region.

This application is based on a Japanese patent application number 2001-64358, and the entire disclosure thereof is incorporated herein by reference.

What is claimed is:

1. A multi-layer information recording medium comprising:
   a plurality of recording layers, each recording layer being made from a material of which reflectance changes upon radiation of a light beam, information being writable in each recording layer as a result of reflectance change made in each recording layer, each recording layer having at least one of at least one groove and at least one pit;
   at least one spacer layer, each of the at least one spacer layer being interposed between two adjacent recording layers of the plurality of recording layers;
   an information rewritable region defined in a first recording layer of the plurality of recording layers, the first recording layer being a layer in which the information is to be written, the information rewritable region being used as a trial recording region when determining a recording condition of the first recording layer; and
   a window region defined in a second recording layer of the plurality of recording layers adjacent to the first recording layer for passing the light beam to the information rewritable region and imparting first diffraction to the passing light beam when determining the recording condition of the first recording layer, the second recording layer having the window region and a remaining portion, the first diffraction effect being different from a second diffraction imparted from the remaining portion of the second recording layer.

2. The multi-layer information recording medium according to claim 1, wherein depth of a groove and depth of a pit formed in the window region are different from depth of another groove and depth of another pit formed in the remaining region of the second recording layer respectively.

3. The multi-layer information recording medium according to claim 1, wherein a distance between adjacent grooves and a distance between adjacent pits formed in the window region are different from a distance between adjacent grooves and a distance between adjacent pits formed in the remaining region of the second recording layer respectively.

4. The multi-layer information recording medium according to claim 1 further including a flat interface formed in the window region.

5. The multi-layer information recording medium according to claim 1, wherein each of the plurality of recording layers includes at least one of a land track and a groove track.

6. The multi-layer information recording medium according to claim 1, wherein each of the plurality of recording layers includes a medium layer made from a phase change material.

7. The multi-layer information recording medium according to claim 1, wherein each of the plurality of recording layers includes a medium layer and a pair of protecting layers sandwiching the medium layer.

8. The multi-layer information recording medium according to claim 2, wherein the window region has a flat area without grooves.

9. The multi-layer information recording medium according to claim 1 further including at least one recording layer without grooves and pits.

10. The multi-layer information recording medium according to claim 1, wherein depth of a groove and depth of a pit formed in the window region are shallower than depth of another groove and depth of another pit formed in the remaining region of the second recording layer respectively.

11. The multi-layer information recording medium according to claim 1, wherein a distance between adjacent grooves and a distance between adjacent pits formed in the window region are smaller from a distance between adjacent grooves and a distance between adjacent pits formed in the remaining region of the second recording layer respectively.

12. The multi-layer information recording medium according to claim 1, wherein the window region and information rewritable region do not overlap pre-pit regions.

13. A multi-layer information recording medium comprising:
   a plurality of recording layers, each recording layer having at least one of at least one groove and at least one pit, information being writable in each recording layer upon radiation of a light beam;

at least one spacer layer, each of the at least one spacer layer being interposed between two adjacent recording layers of the plurality of recording layers;

first means provided in a first recording layer of the plurality of recording layers, the first recording layer being a layer in which the information is to be written, the first means being used when determining a recording condition of the first recording layer; and second means provided in a second recording layer of the plurality of recording layers adjacent to the first recording layer for passing the light beam to the first means and imparting first diffraction to the passing light beam when determining the recording condition of the first recording layer, the second recording layer having the second means and a remaining portion, the first diffraction being smaller than a second diffraction imparted from the remaining portion of the second recording layer.

14. The multi-layer information recording medium according to claim 13, each of the plurality of recording layers includes at least one of a land track and a groove track.

15. The multi-layer information recording medium according to claim 13, wherein each of the plurality of recording layers includes a medium layer made from a phase change material.

16. The multi-layer information recording medium according to claim 13, wherein the second means has a flat area without grooves.

17. The multi-layer information recording medium according to claim 13 further including at least one recording layer without grooves and pits.

18. The multi-layer information recording medium according to claim 13, wherein depth of a groove and depth of a pit formed in the second means are shallower than depth of another groove and depth of another pit formed in the remaining region of the second recording layer respectively.

19. The multi-layer information recording medium according to claim 13, wherein a distance between adjacent grooves and a distance between adjacent pits formed in the second means are smaller from a distance between adjacent grooves and a distance between adjacent pits formed in the remaining region of the second recording layer respectively.

20. The multi-layer information recording medium according to claim 19, wherein a distance between adjacent grooves and a distance between adjacent pits formed in the second means are smaller from a distance between adjacent grooves and a distance between adjacent pits formed in the remaining region of the second recording layer respectively.

21. The multi-layer information recording medium according to claim 2, wherein the depth of a groove and the depth of a pit formed in the window region are shallower than the remaining portion.

22. The multi-layer information recording medium according to claim 1, wherein the window region is a polyangular shape.

* * * * *